April 2, 1935.    D. L. BURNHAM    1,996,670
AUTOMOBILE SIGNALING DEVICE
Filed Oct. 10, 1932    2 Sheets-Sheet 1
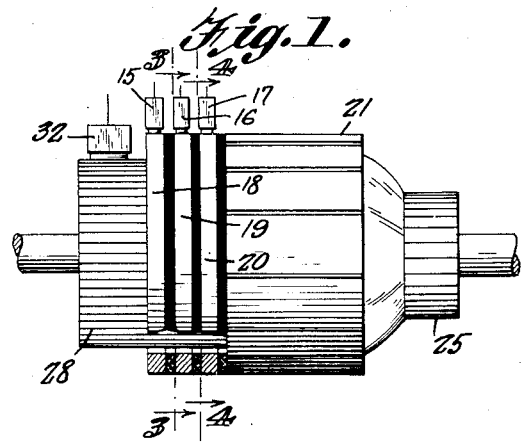
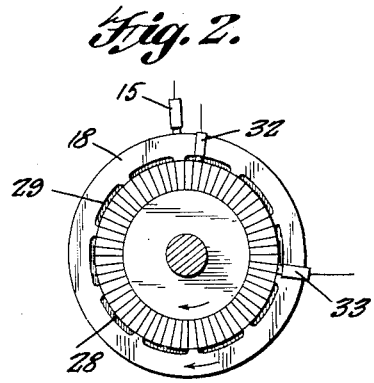
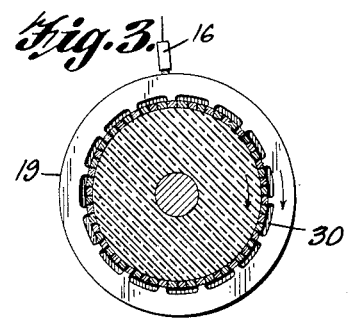
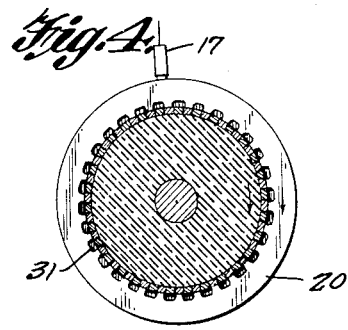
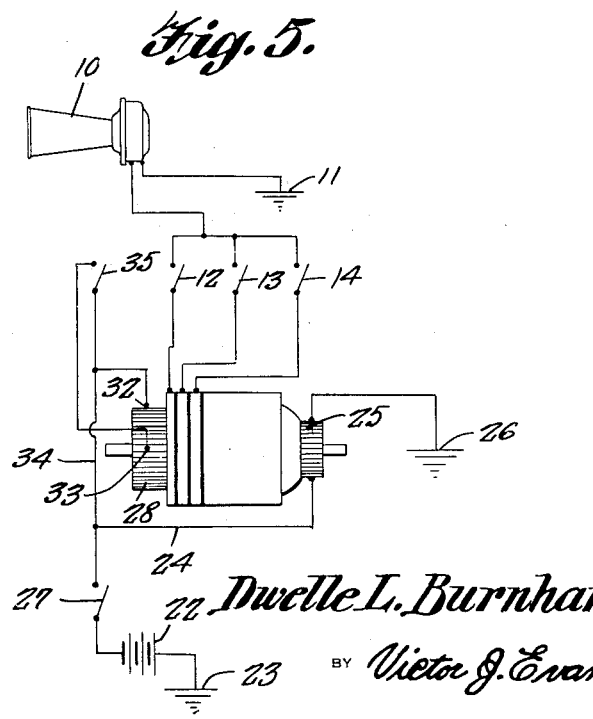
Dwelle L. Burnham,
INVENTOR April 2, 1935.                    D. L. BURNHAM                    1,996,670
                        AUTOMOBILE SIGNALING DEVICE
                    Filed Oct. 10, 1932        2 Sheets-Sheet 2
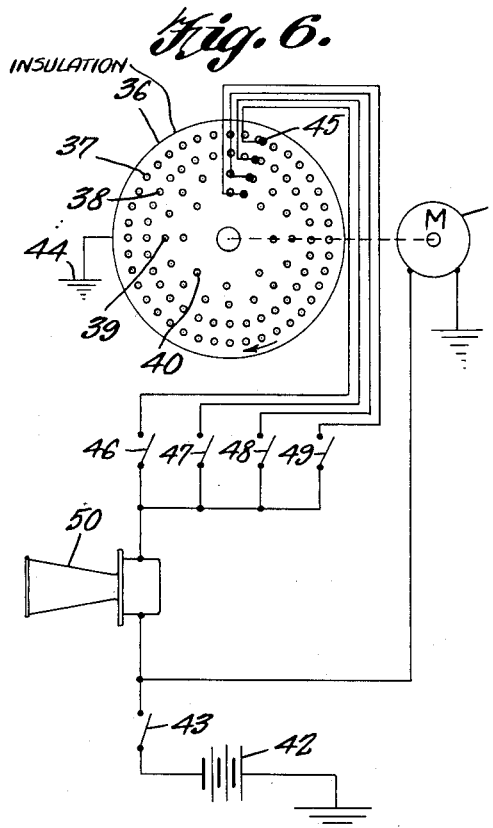
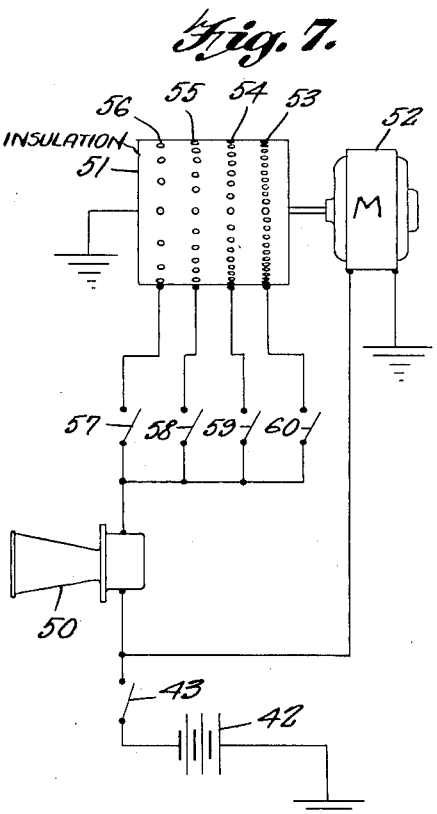
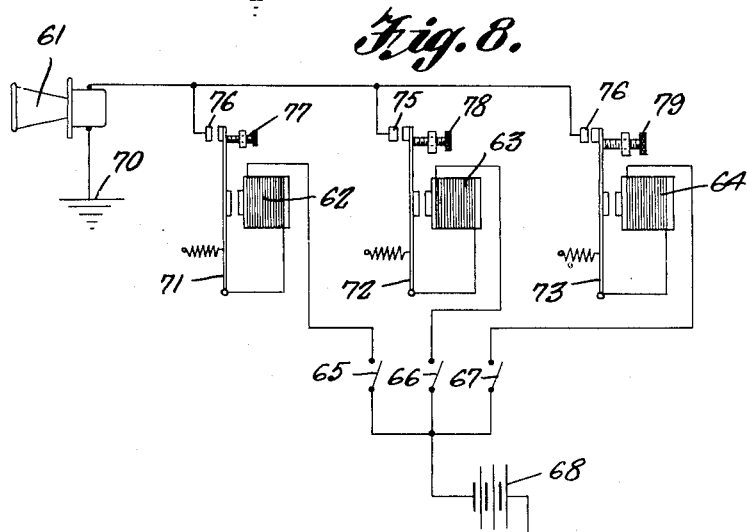

Patented Apr. 2, 1935

1,996,670

UNITED STATES PATENT OFFICE 1,996,670

AUTOMOBILE SIGNALING DEVICE

Dwelle L. Burnham, Washburn, N. Dak.

Application October 10, 1932, Serial No. 637,198

1 Claim. (Cl. 200—24)

The object of the invention is to provide an automobile signaling device whereby the conventional auto vehicle horn may, without modification thereof, be made to emit sounds of different pitch; to provide a device of the kind indicated which may be readily operated from any power source carried by the vehicle; and generally to provide a multiple toned horn sounding device which is of simple form and therefore susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claim.

In the drawings:

Figure 1 is a side elevational view of a motor armature incorporating the invention.

Figure 2 is an end elevational view of the structure of Figure 1.

Figures 3 and 4 are sectional views on the planes indicated by the lines 3—3 and 4—4 respectively of Figure 1.

Figure 5 is a diagrammatic view of a circuit in which the structure of Figure 1 is included as an element.

Figure 6 is a view similar to Figure 5 but showing a modified form of the invention.

Figure 7 is a view similar to Figure 5 but showing still another modified form.

Figure 8 is a diagrammatic view of still another modification of the invention.

Since the purpose of the invention is to cause the automobile signal horn 10 to emit sounds of different pitch, the conventional make and break of the horn is cut out and one of its terminals grounded as indicated at 11, the other terminal being connected to one contact of each of the switches 12, 13 and 14 whose other terminals are connected to brushes 15, 16 and 17 which bear upon rings 18, 19 and 20.

The rings 18, 19 and 20 are mounted upon an armature 21 designed to rotate in an appropriate magnetic field (not shown) and to be energized from the battery 22 which, having one terminal grounded as at 23, has the other terminal connected by a conductor 24 with a brush bearing on the commutator 25 of the armature, the other brush of said armature being grounded as indicated at 26. The motor circuit is controlled by a switch 27 included in the conductor 24. Obviously, therefore, when the switch 27 is closed, the armature will be energized and will be set into motion, the rings 18, 19 and 20 sliding under their respective brushes.

But the said rings are disposed in surrounding relation to a commutator 28 which is mounted on the heel end of the armature 21 but is unconnected with the armature windings. The said rings are insulated from each other and are recessed on their inner peripheries as indicated at 29, 30 and 31, so that uniformly spaced feet are provided on the inner periphery of each ring to bear one each upon one of the segments of the commutator 28. For example, the recesses 29 are of greater angular extent than the recesses 30 and the latter of greater angular extent than the recesses 31, so that the segment bearing feet of the different rings are differently spaced. By reason of the bearing feet defined by the recesses 29, the ring 18 is electrically connected with every sixth segment of the commutator 28. Similarly, the recesses 30 result in such spacing of the bearing feet of the ring 19 that it is connected with every fourth segment, while the recesses 31 leave bearing feet which will electrically connect the ring 20 with every other segment.

Bearing upon the commutator are the brushes 32 and 33 and these are designed for relative adjustment, so that their angular spacing on the commutator may be varied. The brush 32 is connected in on the conductor 24 by means of a conductor 34, while the brush 33 is connected in parallel with the brush 32, but in series with a switch 35.

If the switch 27 be closed, the armature will be set in operation by current flowing from the battery 22 and the horn may be energized by closing any one of the switches 12, 13 or 14. If the switch 12 be the one closed, current will flow from the battery over the conductor 34 to the brush 32 and each time a segment which is connected with the ring 18 passes under the brush, current will flow through the ring, the switch 12, through the horn and back to the battery through the ground 11. But the commutator is moving at a uniform angular velocity and at uniform intervals will establish the circuit on the horn, so that the vibrations of the horn diaphragm will be uniform and a certain definite sound will be emitted. If the switch 13 be the switch closed, the ring 19 will be placed in series with the source and the circuit on the horn will be made and broken at uniform intervals, just as was the case with the ring 18. But the ring 19 groups more segments of the commutator than the ring 18, so that the rate of opening and closing the circuit, while uniform, will be greater than when the ring 18 was active, so that a different sound will be emitted by the horn 10. The same condition obtains if the switch 14 be closed, because the ring 20, grouping still a greater number of the segments of the commutator will increase the rate of opening and closing the circuit, with a consequent increase in the number of vibrations imparted to the horn 10. Thus with a single source, the horn 10 is caused to emit different sounds, depending on which of the switches 12, 13 or 14 is closed.

The switch 35 is intended to be used jointly with the switches 12, 13 and 14, for if it be closed, the brush 33 is placed in circuit and if that be given such a position with reference to the brush 32 that it will not, at the same time, fall on a segment connected with one of the rings when the brush 32 falls on such a segment, the rate of vibration may be still further increased. For example, with the switch 35 closed, let it be assumed that the switch 12 is also closed but that the brush 33 is so positioned that when the brush 32 is on a segment connected with the ring 18, it will be on one of the segments between the bearing feet defined by the recesses 29. The circuit on the horn will thus be established when a segment connected with the ring 18 passes under the brush 32 and again when such a segment passes under the brush 33. But the making and breaking of the circuit by the brush 33 will intervene between the making and breaking of the circuit by the brush 32, so that the number of vibrations will be increased and if the brush 33 is so positioned that it will result in doubling the vibrations, a note the octave of that due to the brush 32 alone will be sounded by the horn 10. The rings 19 and 20 and their attendant switches 13 and 14 can be made to function in connection with the two brushes 32 and 33, by operating said switches when the switch 35 is closed.

In that form of the invention shown in Figure 6, the commutator and its associated rings are replaced with a disk 36 in the face of which are disposed series of contacts 38, 39 and 40, these contacts being arranged in concentric series of which the number of units in each differ from the number of units in any other series. The disk is driven by a motor 41 energized from a battery 42 and controlled by a switch 43, the one terminal of the battery and one terminal of the motor being grounded to provide for a single conductor operation of the motor. The contacts of the several series are grounded as indicated at 44 and bearing upon the face are the brushes 45 so arranged that each one bears upon one of the series of contacts. The brushes are connected one each with the switches 46, 47, 48 and 49, the several switches having their one terminal connected in common with one terminal of the horn 50 whose other terminal is connected to the switch 43. When the switch 43 is closed, the motor 41 will obviously be set in rotation and any one of the switches 46, 47, 48 or 49 may be closed, when the horn 50 will be subject to energization by any one of the series of contacts on the disk, depending on which switch is closed. For example, if the switch 40 is closed, current will flow from the battery to the horn, through the switch 46 to the brush bearing on the contacts 37 and as it passes from one to the other, the circuit on the horn will be intermittently broken and established, so that the diaphragm of the horn will be subjected to a series of vibrations which will cause it to emit a definite sound. Since the number of contacts in each series differs, the closure of any one of the other switches will result in the emission of a different sound from the horn due to the changed rate of making and breaking the circuit.

The modification shown in Figure 7 is substantially identical with that shown in Figure 6 with the exception that in place of the disk or a commutator and associated rings, a drum 51 is employed carried on the shaft of the motor 52, the drum being provided with a series of contacts 53, 54, 55 and 56, the number of contacts in each series being different from the number in any other series, so that the rate of making and breaking the circuit will depend on which of the switches 57, 58, 59 or 60 is closed.

In the modification shown in Figure 8, the means for changing the rate of vibration of the diaphragm and the horn 61 is effected by the use of electromagnets 62, 63 and 64 whose windings are connected to the switches 65, 66 and 67. The switches 65, 66 and 67 all have one terminal connected in common to one terminal of a battery 68 whose other terminal is grounded as indicated at 69, the horn 61 having one terminal grounded as indicated at 70. Armatures 71, 72 and 73 are connected in series with the magnets 62, 63 and 64 to function as circuit breakers and these armatures are spring retracted to engage them with the fixed contacts 74, 75 and 76, all of which are electrically connected together and to one terminal of the horn 61. Adjustment screws 77, 78 and 79 are positioned to be engaged by the armatures to limit their movement toward the magnets.

The springs normally hold the armatures in engagement with the fixed contacts and if a magnet is energized, as by closing its particular switch, the armature is attracted by the magnet and is withdrawn from engagement with the fixed contact, so that the circuit on the horn is thus broken intermittently and established by the alternate action of the magnet and armature spring.

Different rates of vibration for the armatures is secured by the adjustment of the particular adjusting screws. For example, the adjusting screw 79 is set for a comparatively slight separation between the armature 73 and its fixed contact 76. The adjusting screw 78 is set to provide for a wider separation between the armature 72 and the fixed contact 75, while the adjusting screw 77 is adjusted for a still wider separation between the armature 71 and the contact 74. If the switch 57 be closed, the magnet 64 will be energized and its armature 73 attracted, thus opening the circuit on the magnet and permitting the spring to return the armature to engagement with the contact 76, when the circuit is reestablished and the same series of operations is repeated. By reason of the adjusting screw providing for but a slight separation of the armature and fixed contact, the rate of making and breaking the circuit, while uniform, is comparatively high, with the result that a definite tone is emitted by the horn 61. If the switch 66 be closed, the circuit on the horn is intermittently broken and established by the operation of the magnet 63, but because its armature can move a greater distance, by reason of the setting of the adjusting screw 78, a different rate of circuit closing and opening will result, and a different sound is emitted by the horn 61. A still different tone is emitted by the horn when the switch 65 is closed, by reason of the smaller number of vibrations of the armature 71, due to the setting of its adjusting screw 77 providing for a greater magnitude of movement of the armature in each circuit making and breaking operation.

The invention having been described, what is claimed as new and useful is:

A rotary making and breaking device comprising a rotary member, a commutator composed of a circular series of insulated segments, and a plurality of insulated collector rings disposed in surrounding relation to the commutator at one end to leave a brush bearing surface on the commutator adjacent the rings, a selected set of segments angularly spaced uniformly around the commutator being electrically connected with one ring, a similar set but embracing more segments being electrically connected with another ring, and another set embracing still more segments being electrically connected with the remaining ring.

DWELLE L. BURNHAM.